Dec. 15, 1936.  A. GERARDI  2,064,107
FRONT WHEEL SUSPENSION FOR MOTOR CARS
Filed May 1, 1933
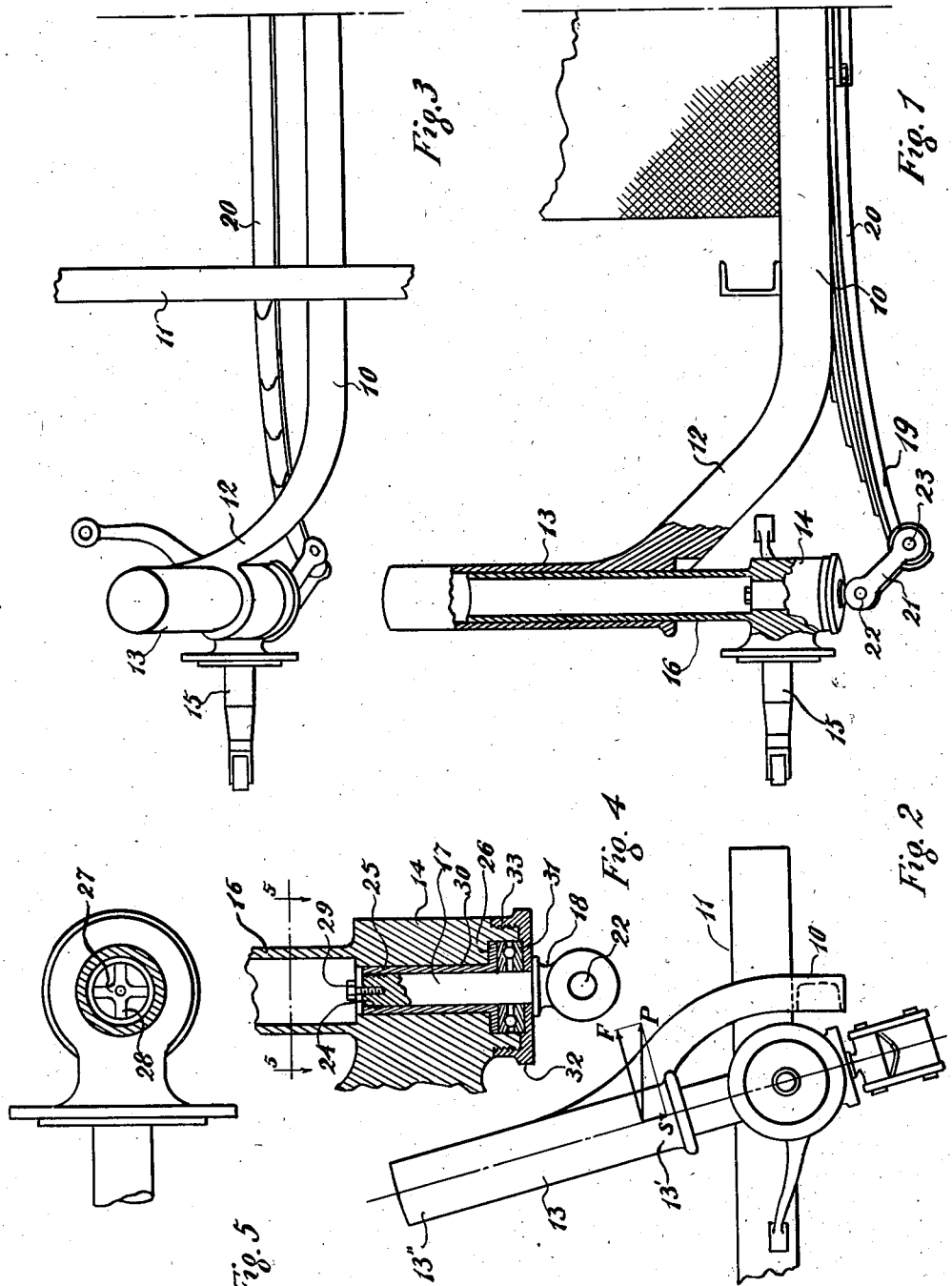
INVENTOR
Aldo Gerardi
BY
his ATTORNEY Patented Dec. 15, 1936

2,064,107

UNITED STATES PATENT OFFICE 2,064,107

FRONT WHEEL SUSPENSION FOR MOTOR CARS

Aldo Gerardi, Galliate, Italy

Application May 1, 1933, Serial No. 668,721

3 Claims. (Cl. 280—96.2)

This invention relates to motor car construction and more particularly refers to improvements in telescopic suspensions for the front wheels of motor cars.

In another application for patent entitled Telescopic suspension for the front wheels of motor vehicles, Serial No. 645,630, copending herewith, I have described and claimed a telescopic suspension for the front wheels of a motor car, in which the wheels are carried by members mounted to slide vertically within the hollow vertical ends of the front axle of the motor car, which is rigidly fixed to the under frame, the sliding movement of said wheel-carrying members being contrasted by the action of a spring.

The main novel feature to which the said copending application more particularly refers resides in a special manner of connecting the vertically sliding members to the spring, whereby the spring acts not only to absorb the shocks transmitted to the wheels by obstacles on the road, but also acts to generate upon the wheel-carrying members a laterally directed force tending to neutralize the pressure exerted by the telescopic portion of said wheel-carrying members against the surfaces of their respective supports, due to the action of the ground against the wheels.

The main advantage to be derived from an arrangement of this type is that the wheels are completely independent one from another so that the shocks taken up by one wheel when passing over an obstacle on the road are not transmitted to the other wheel.

The neutralization of the pressure exerted by the telescopic members against the surfaces of their respective supports has the effect of reducing the frictional resistance to the vertical sliding movements of said wheel-carrying members to a minimum, with resulting easy riding action and less wear on the parts involved.

The arrangement is, of course, so constituted as to allow steering movements of the wheel-carrying members with respect to the spring connected thereto, through the use of a pivotal connecting member coaxial with the telescopic elements.

In practice, I have found that a substantially vertical telescopic suspension, such as specified in my copending application above referred to, satisfactorily answers the requirements of ordinary travel, the shocks being transmitted to the outer ends of the spring, which is preferably of the semi-elliptical type and being, therefore, almost completely absorbed by it, before they can reach the central attachment of the spring to the frame.

However, the driving force exerted upon the chassis by the driving wheels at the rear, being transmitted to the front wheels through the intermediary of the vertical supports integral with the front axle, said force which is frontwardly directed sets up a reaction between said supports and the telescopic portions of the wheel-carrying members, which causes side pressure to develop between their contacting surfaces and a consequent considerable frictional resistance to the sliding movement of the wheel carriers.

Under these conditions, while the spring suspension is responsive to forces applied vertically, such as are due to inequalities of the road, it is not responsive to forces applied to the car in a longitudinal direction. Thus when the car is first started, the propelling force which, as stated, is transmitted to the front wheel carriers by their vertical supports and which is longitudinally directed, does not in any way affect the status of the spring or springs interposed between the wheel carriers and the car frame. The starting of the car results, therefore, in a sudden longitudinally directed shock which is not attenuated by any spring action, which will cause discomfort and even danger to passengers. A similar objectionable occurrence may take place when the car is suddenly stopped by the application of the brakes or by collision. In order to add to the easy riding qualities of the car it is, therefore, desirable that proper arrangements be provided for absorbing, at least in part, the shocks due to longitudinally exerted forces, acting against the front part of the car or against the elements of the front axle.

The primary object of this invention is accordingly to provide in a telescopic suspension of the character specified a novel and improved arrangement of parts, whereby forces applied longitudinally to the elements of the front axle will automatically set up a component force axially directed with respect to the telescopic elements of the suspension, which will, in its turn, cause a deformation of the suspension spring.

In other words, the arrangement is such that the shocks produced by longitudinally directed forces are to a certain extent absorbed by the spring suspension so as to neutralize the unpleasant and dangerous consequences of a lack of response by elastic elements to such forces.

Another object is to provide in a motor car a novel and improved type of telescopic suspension for its front wheels, which will be capable of not only absorbing the shocks due to inequalities of the road, but also the shocks due to forces applied longitudinally to the car structure.

A further object is to provide a telescopic suspension of the character specified of an extremely simple construction, consisting of but a few parts, yet capable of imparting to the car a maximum of easy riding qualities and comfort for its passengers.

Other objects and advantages of the present invention will more fully appear as the description proceeds and will be set forth and claimed in the appended claims.

My invention is illustrated by way of example in the accompanying drawing, in which:

Fig. 1 is a fragmentary front elevation, partly in section, of the front axle of a motor car embodying my invention;

Fig. 2 is a side view in elevation thereof;

Fig. 3 is a plan view thereof;

Fig. 4 is a fragmentary vertical section, in an enlarged scale, through the lower part of the wheel carrier; and Fig. 5 is a fragmentary section through line 5—5 of Fig. 4.

Referring to said drawing, 10 designates the front axle which is secured to the longitudinal frame members, such as 11 and which is preferably formed with its outer ends 12 bent rearwardly of its body portion. Each end of said axle is formed with an upwardly directed guiding support 13, which as Figs. 2, 3 clearly show is somewhat inclined so that its lower end 13' is spaced towards the front of the car frame, that is, in the normal direction of the car movement, with respect to its upper end 13".

The wheel suspension also comprises a wheel carrier for each wheel, said wheel carrier comprising a body portion 14, a wheel spindle 15 outwardly extending therefrom and a rod member 16, upwardly extending from its body portion 14, said rod member being inserted within guiding support 13 and being axially slidable, as well as rotatable about its own axis, with respect thereto.

The lower end of body portion 14 is provided with a pivotal connecting member 17, provided with an attaching portion 18, downwardly extending therefrom, said pivotal connecting member being coaxial with rod 16 and being rotatably mounted with respect to their common axis.

The connecting portion 18 of said pivotal connecting member is attached to the free end 19 of a spring 20, which is preferably of the semi-elliptical type and which is preferably secured midway of its length to the central portion of the car frame.

Said spring is preferably mounted so that its central longitudinal line lies on the inclined plane passing through the axes of rods 16; furthermore the connection between each free end 19 of the spring and the pivotal connecting member of the adjoining wheel-carrying member is preferably effected by means of an inwardly inclined link member 21, forming with said spring and wheel-carrying member an articulated structure, of which longitudinally directed connecting pins 22, 23 also form part.

As explained in my co-pending application above referred to, the object of the inwardly directed link connection 21, between each wheel-carrying member and the adjoining end of the spring, is to utilize the downward force exerted by the spring, due to its tension, in order to set up in the wheel-carrying member a laterally directed component force, tending to neutralize the pressure exerted by rod 16 against the inner surface of its guiding support 13, due to the reaction of the ground against the wheel carried by spindle 15.

By virtue of this construction, the frictional resistance, which would otherwise develop to the axial displacements of rod 16 and the ensuing wear of the contacting surfaces of said parts 16 and 13, are to a large extent diminished and as a result both the riding qualities of the car and the life of the parts involved are greatly benefited.

The preferred construction of axle shown, in which the outer ends are bent rearwardly of the body thereof, has for its object to permit the placement of the suspension spring behind the axle, this representing an advantage both from the standpoint of improved appearance and from the standpoint of decreased height of the car frame from the ground.

Connecting member 17 is preferably mounted within body portion 14 of the wheel-carrying member in a manner positively preventing its axial displacements in relation thereto. For instance, in Figs. 4 and 5 I illustrate an arrangement in which the upper end of pivotal member 17 is threaded, as shown at 24, and is screwed into the upper end of a sleeve 25, the lower end of which is formed with a flange 26. Threaded portion 24 is prevented from rotation with respect to the sleeve 25 by means of a washer 27, having radially extending arms 28, inserted within corresponding slots provided at the upper end of both parts 17 and 25, said washer being secured to the upper end of part 17 by means of a screw 29.

The lower end of the opening 30 through which sleeve 25 is inserted in body portion 14 of the wheel-carrying member is enlarged so as to house flange 26 and also a thrust bearing 31, resting against said flange and retained in position by a cap 32 screwed onto the lower end of body portion 14, which is threaded, as shown at 33.

It is obvious that by virtue of this arrangement, pivotal member 17 is securely held in place while steering movements of the wheel carrier can freely take place, with respect to said member 17 and spring 20 connected thereto.

The inclination of the telescopically mounted members 13, 16 results in a smoother riding action of the car, both when it is being started and stopped, due to the fact that either the propelling or restraining force applied to the chassis, as the case may be, gives rise to a component force directed axially of the telescopic suspensions, which component force will be absorbed by the spring.

A diagrammatic illustration of the forces playing upon the telescopic suspension described is given in Fig. 2, where P represents the propelling force exerted by the rear driving wheels, which propelling force is applied to the chassis and through it to the guiding supports 13 of the axle, and is horizontally directed towards the front of the car. Said force which is developed, for instance, when the car is started will give rise to two components, one F, which is at right angles to the axis of the parts 13, 16, and the other one, S, which is downwardly directed along said axis. The component force F, which has a value smaller than P, gives rise, of course, to a frictional resistance between the surfaces of parts 13 and 16, which is, however, less than the frictional resistance which would be developed by the propelling force P, if parts 13, 16 were vertically directed.

The component force S, which is downwardly directed, will be absorbed by the spring and will, therefore, act as a cushioning force, easing the starting of the car. A similar action will take place when the brakes are applied to the wheels, exerting a force which will be rearwardly and horizontally applied with respect to parts 13; this force also giving rise to an axial component force which will be taken up by the deformation of the suspension spring.

It is, therefore, obvious that by inclining the telescopically related members of the suspension, I realize notable advantages over similar arrangements of the type where the telescopic members are disposed in a vertical, or substantially vertical, plane. The degree of inclination to be given to the telescopic elements of the suspension can be determined in each case, taking into account both the propelling force exerted by the rear wheels due to the action of the motor, and the inertia of the mass to be moved at the start, as well as the momentum acquired by the car at high speeds, and the retarding force exerted by the brakes. For instance, in the case of a racing car equipped with a powerful motor and having to run along a course including many curves and requiring powerful and frequent braking, the inclination of parts 13, 16 should be greater than in the case of an ordinary pleasure car.

The constructional details of my invention may vary from those shown without departing from the inventive idea; the drawing, therefore, will be understood as being intended for illustrative purposes only and not in a limiting sense.

I accordingly reserve the right to carry my invention into practice in all those ways and manners which may enter, fairly, into the scope of the appended claims.

I claim:

1. A telescopic suspension for the front wheels of a motor car, comprising a frame having an axle, a guiding support at each end of said axle, inclined along a longitudinal plane substantially parallel to the central line of said frame, so that the lower end of said support will be frontwardly spaced with respect to its upper end, two wheel carrying members each including a steering pivotal member mounted in telescopic relation to one of said supports, a leaf spring secured to the central part of said frame and extending laterally thereof, and means connecting each end of said spring to one of said wheel carrying members, said connecting means including a connecting pivotal pin mounted at the lower end of said wheel carrying member, coaxial with and rotatable about the axis of its corresponding steering pivotal member, and an inwardly directed link articulatedly connecting said pivotal pin to said spring.

2. A telescopic suspension for the front wheels of a motor car, comprising a frame having an axle, a guiding support at each end of said axle, inclined along a longitudinal plane substantially parallel to the central line of said frame, so that the lower end of said support will be frontwardly spaced with respect to its upper end, two wheel carrying members each including a steering pivotal member mounted in telescopic relation to one of said supports, a semi-elliptical spring having its central portion secured to the central part of said frame, and extending transversely thereof, the central longitudinal line of said spring lying substantially on the same plane with the inclined axes of said supports, and means connecting each end of said spring to one of said wheel carrying members, said connecting means including a connecting pivotal pin mounted at the lower end of said wheel carrying member, coaxial with and rotatable about the axis of its corresponding steering pivotal member, and an inwardly directed link articulatedly connecting said pivotal pin to said spring.

3. A telescopic suspension for the front wheels of a motor car comprising a frame having an axle, the end portions of said axle being bent rearwardly of its body portion, and each forming a guiding support inclined along a longitudinal plane substantially parallel to the central line of said frame, so that the lower end of said support will be frontwardly spaced with respect to its upper end, two wheel carrying members each including a steering pivotal member mounted in telescopic relation to one of said supports, a semi-elliptical spring having its central portion secured to the central part of said frame, and extending transversely thereof, the central longitudinal line of said spring lying substantially on the same plane with the inclined axes of said supports, and means connecting each end of said spring to one of said wheel carrying members, said connecting means including a connecting pivotal pin mounted at the lower end of said wheel carrying member, coaxial with and rotatable about the axis of its corresponding steering pivotal member, and an inwardly directed link articulatedly connecting said pivotal pin to said spring.

ALDO GERARDI.